Oct. 4, 1966  A. B. HOLMES  3,276,488
TANK VIEWER AND INJECTION FITTING
Filed March 27, 1964  4 Sheets-Sheet 1

INVENTOR.
ALLIE B. HOLMES
BY Semmes & Semmes
ATTORNEYS

INVENTOR
ALLIE B. HOLMES
BY
Semmes & Semmes
ATTORNEYS

Oct. 4, 1966   A. B. HOLMES   3,276,488
TANK VIEWER AND INJECTION FITTING
Filed March 27, 1964   4 Sheets-Sheet 3
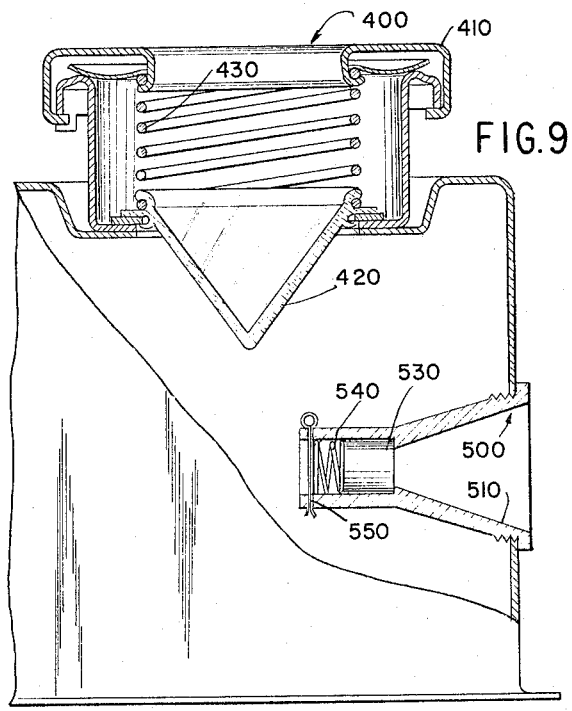
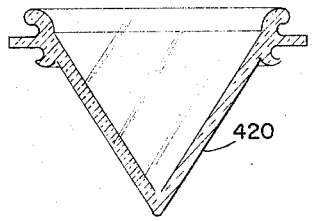
FIG. 11
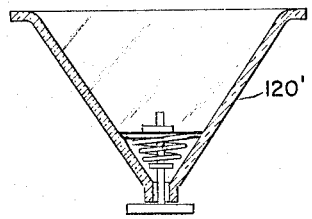
FIG. 12
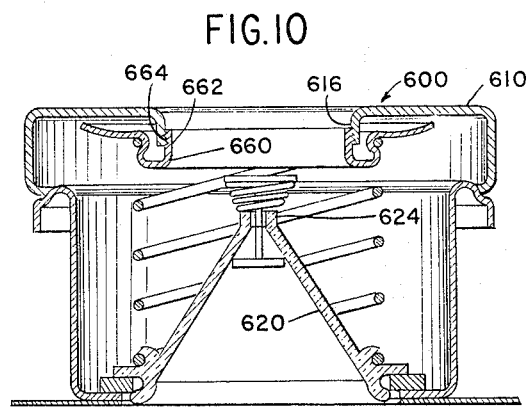
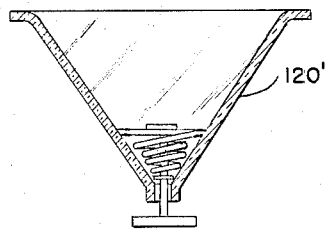
FIG. 13
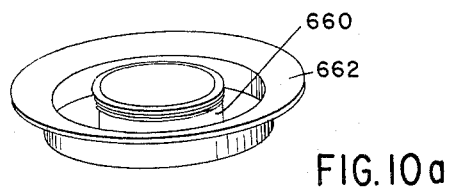
INVENTOR.
ALLIE B. HOLMES
BY
Semmes & Semmes
ATTORNEYS Oct. 4, 1966 A. B. HOLMES 3,276,488
TANK VIEWER AND INJECTION FITTING
Filed March 27, 1964 4 Sheets-Sheet 4

INVENTOR
ALLIE B. HOLMES
BY
Semmes & Semmes
ATTORNEYS

United States Patent Office 3,276,488
Patented Oct. 4, 1966

3,276,488
TANK VIEWER AND INJECTION FITTING
Allie B. Holmes, Box 698, Mathis, Tex.
Filed Mar. 27, 1964, Ser. No. 355,288
8 Claims. (Cl. 141—311)

This application is a continuation-in-part of my application Serial Number 259,088, filed February 18, 1963, now U.S. Patent No. 3,211,321.

This invention concerns a combined fluid level viewing apparatus and fluid injection fitting. In one embodiment of the invention the disclosure illustrates a radiator cap, having means to disclose the coolant level in a top tank, and having apparatus to provide the filling of the radiator without removing the cap.

Among the requirements of fluid tanks are apparatus to determine the level of fluid within the tank, a means to add fluid to the tank, an over-pressure safety release, and a vacuum break.

Those needs are more or less manifest in the operation of an automobile, especially in the servicing of a radiator. To gain maximum efficiency from necessarily small cooling systems, coolant is kept under pressure. In order to check the level of the coolant within the radiator, it is often necessary to remove the cap for a visual observance. When checking a radiator, the slow reduction of pressure is time consuming, but the immediate reduction of pressure within a system too often results in a loss of fluid from the radiator and in painful burns to an attendant.

Common radiator caps in use today provide two functions: (1) safety over-pressure release; and (2) vacuum break. This invention adds to the utility of a radiator cap by allowing coolant level viewing and providing for the injection of coolant without removing the cap and waiting for the reduction of pressure within the system. These added results are accomplished by providing a transparent cone, open at both ends, which at once acts as a viewing and injection fitting.

Accordingly, it is the object of the invention to provide apparatus for visually inspecting the fluid level in a tank and for injecting fluid into the tank.

An additional object of this invention is the provision of a method of viewing fluid level and filling a tank without venting the tank to the atmosphere.

Moreover, it is an object of this invention to combine the functions of viewing, injecting, pressure releasing, and vacuum breaking in a single tank fitting.

Moreover, it is an object of this invention to provide a tank fitting with provisions for all of these functions, which fitting may be readily interchanged with a common automobile radiator cap.

Further objects of the invention will be seen from the accompanying specifications and from the drawings, in which:

FIGURE 9 illustrates a corner of a radiator in which a viewing cap has been inserted in the top and in which a viewer and injection fitting has been inserted in the side.

FIGURE 10 illustrates the disengaged position of a radiator cap in which the viewing and injecting cone, shown in FIGURES 1 and 3, has been inverted;

FIGURE 10a is a detail of the secondary seal shown in FIGURE 10;

FIGURE 11 is an enlarged view of the basic cone shown in FIGURE 9;

FIGURE 12 is a cross section of a basic viewer and injection fitting shown in the closed portion;

FIGURE 13 is the same fitting of FIGURE 12 shown in the open position;

Figure 1:
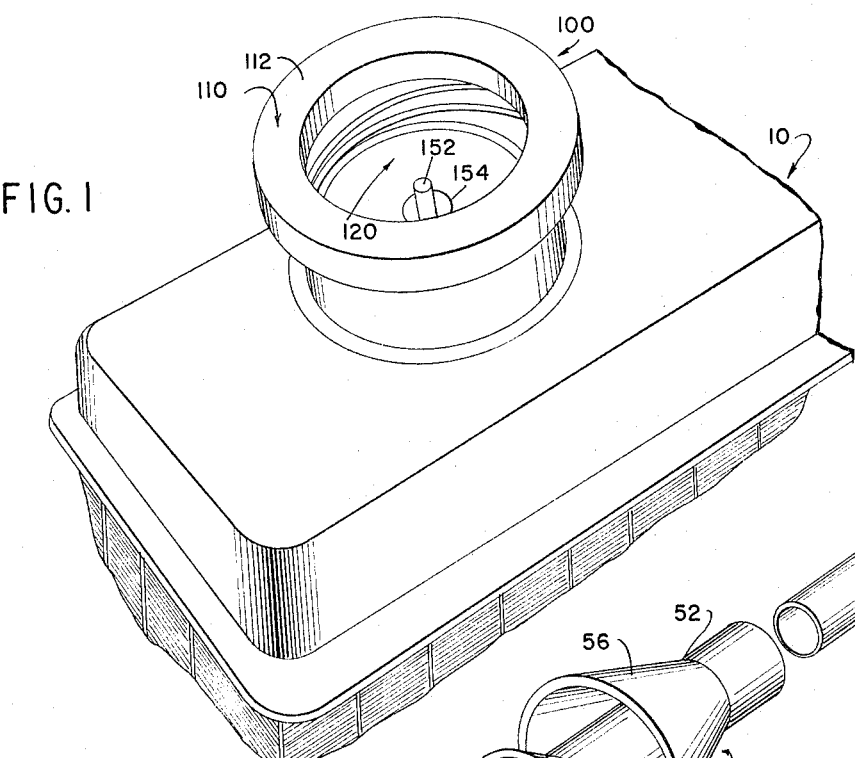
FIGURE 1 is a perspective view of my novel tank fitting installed in an automobile radiator.
Figure 3:
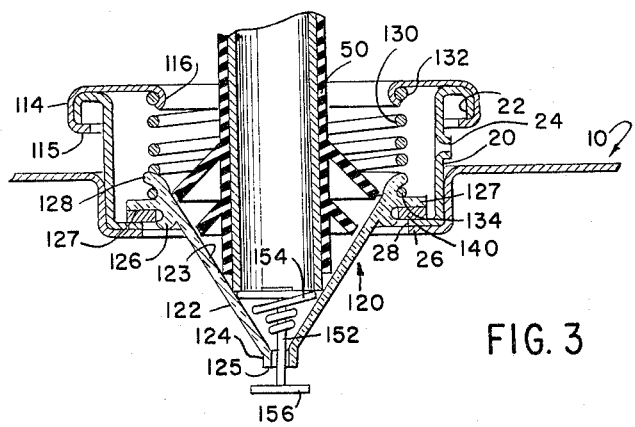
FIGURE 3 is a sectional view of the assembly shown in FIGURE 1, to which fluid pressure is being supplied by a hose such as that shown in FIGURE 2.

Referring to FIGURES 1 and 3, the top tank of an automobile radiator is generally indicated by the numeral 10. Cap receiver 20 is soldered to radiator tank 10 about an opening therein to receive radiator cap 100. As is generally common in radiators, the upper portion of receiver 20 comprises an outwardly and downwardly extending lip 22 which engages a corresponding lip of the cap. A port 24 conducts overflow from the interior of the receiver. The flat base 28 of receiver 20 is welded or soldered to the annular depressed portion 26 of the top tank 10.

Cap or fitting 100 is constructed of seven elements. Lid 110 is attached to spring 130, which in turn is fixed to the combined transparent viewing glass and injection device 120. A pliable washer 140 is an integral part of the cap assembly. The lower end of the conical viewing glass 120 terminates in an opening through which extends stem 152 of a check valve.

Specifically, cap 110 comprises a flat surface 112, terminated at its outward extension by a perpendicular wall 114. Inwardly extending lip 115 engages the downwardly extending lip 22 of cap receiver 20 in the well-known manner of radiator caps. The inner, curved rim 116 of lid 110 engages the upper coil 132 of spring 130.

Viewer 120 is equipped at its widest part with a rim 128, which holds the lower coil 134 of the spring, making the entire lid, spring and viewer a unitary assembly. The outer wall 122 of the viewer 120 is terminated at its lower end by a downwardly extending portion 124, which abruptly stops in a check valve bearing surface 125. Near the upper limit of viewer 120, an integral sealing flange 127 is extended. Intricately formed ledge 126 of viewer 120 holds the resilient washer 140 against the sealing flange 127.

The injection and vacuum-breaking check valve comprises vertical stem 152, which extends through the hole at the lower extremity of viewer 120. A spiral spring 154 is connected at its smallest portion to the stem 152. The largest portion of the spiral spring 154 bears against the inside wall 123 of viewer 120. When water pressure is applied in the viewer, pressure upon seal 156 extends the spiral spring 154, opening the valve to permit the flow of coolant or water.

During operation of the automobile of which the radiator is a part, there exists a vapor pressure in the tank. When the engine is at rest and the temperature of the cooling system drops, the vapor condenses, causing a partial vacuum in the tank. Since the tank is not configured to withstand an external pressure differential, the vacuum is relieved by operation of the injection check valve. Atmospheric pressure acts upon seal 156 and distends spring 154 until the ambient and tank pressures are equal.

Figure 2:
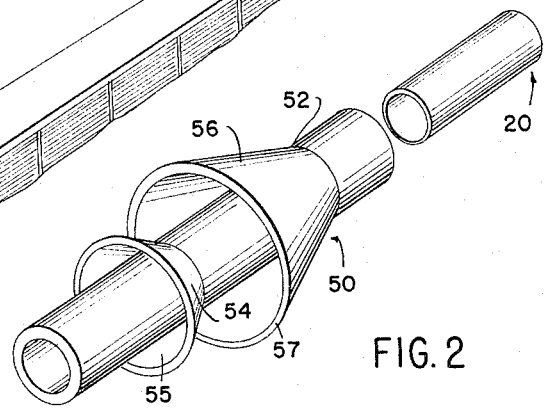
FIGURE 2 is a perspective view of a hose or a hose sleeve to be used with the injection fitting.

The hose for adding water may be a conventional gas station hose. Preferably, to adequately seal the viewing glass 120 and to prevent splash, the hose terminates in or is slipped into a nozzle 50 as shown in FIGURE 2. It may be seen that the numeral 52 then represents a portion of the hose or hose cover. Successively increasing, parallel cones 54 and 56 form a seal with transparent viewer 120. Specifically, the edge 57 of the nozzle cone engages the inner side 123 of the viewer and internal cups 55 catch splashed water.

Figure 4:
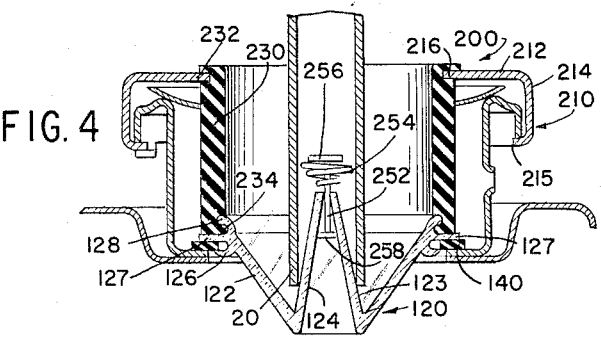
FIGURE 4 is a sectional view of the similar radiator fitting having a reentrant cone.

FIGURE 4 represents a slight variation of the embodiment shown in FIGURE 1. Lid 210 of cap 200 engages the radiator receiver in the well-known manner. Rim 216 at the innermost edge of top 212 engages a compressible rubber cylinder 230. The lower portion 234 of the cylindrical rubber spring 230 engages an upper rim 128 on the cone 120. As may be seen from the drawing, the entire upper portion of the cone is configured in the same manner as the cone shown in FIGURE 3. A reentrant portion 124 of the cone extends upwardly and is terminated by an aperture and valve seal. Stem 252 of check valve extends through the aperture and has mounted at its lower end a seal 258. The lower portion of spiral spring 254 contacts the upper limit of the cone. The largest portion of the spring 254 is connected to stem 252 near its upper limit.

Figure 8:
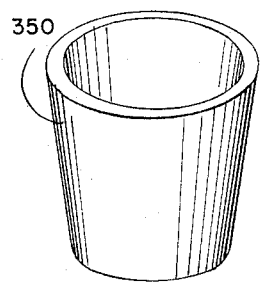
FIGURE 8 is a perspective view of the resilient conical ring used with the device shown in FIGURE 5.
Figure 5:
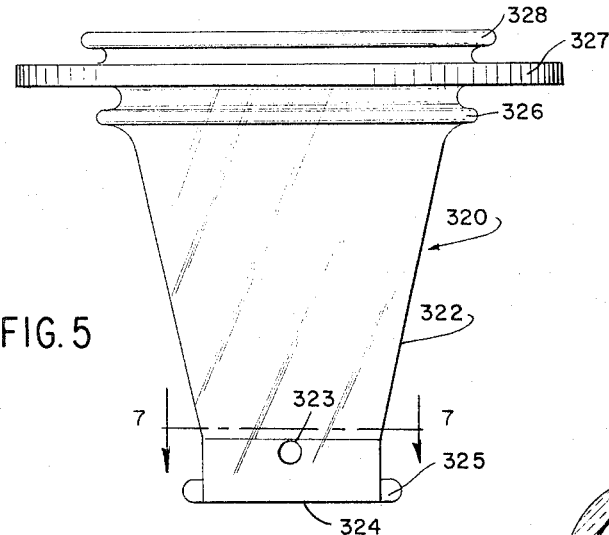
FIGURE 5 is an elevation of transparent viewing and injecting apparatus.
Figure 7:
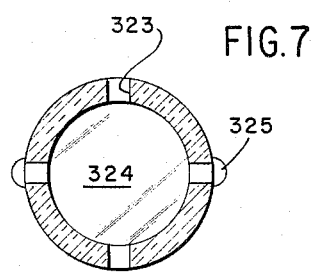
FIGURE 7 is a sectional plan view taken along line 7—7 of FIGURE 5.
Figure 6:
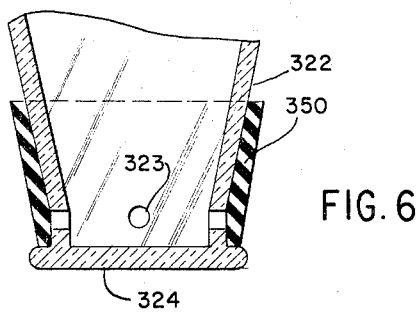
FIGURE 6 is a cross-sectional view of the lower portion of the device shown in FIGURE 5.

FIGURE 5 illustrates a second embodiment of the sight glass. Upper ridges 326 and 328 of sight glass 320 are identical with the ridges 126 and 128 of the FIGURE 3 configuration. Sealing flange 327 projects radially near the upper extremity of sight glass 320. Side 322 terminates in a flat base from which project lugs 325. A series of holes 323 extend perpendicularly through wall 322 adjacent to base 324. As shown in the cross-sectional view of the lower portion of glass 320, holes 323 are releasably sealed by resilient band 350. The general shape of that resilient band is shown in FIGURE 8. FIGURE 7 illustrates the locus of the horizontal holes 323. Preferably, lugs 325 extend only on two sides of the base of the glass.

The water level can be viewed through side 322 and base 324 of viewer 320. If water is needed within the tank, water pressure applied in the interior of the glass 320 will extend the lower portion of the seal 350, permitting flow through holes 323. In the same manner, when a vacuum exists in a tank, atmospheric pressure will act upon the seal 350 to bleed air through holes 323.

FIGURE 9 illustrates a radiator cap having a simple viewing glass 420, which may be observed in better detail in FIGURE 11. The radiator tank shown in FIGURE 9 additionally supports, in its side, a combination viewing glass and injection fitting 500. The viewing portion comprises conical wall 510 having a movable piston 530, which is urged into sealing relationship with the cone by spring 540. The spring in turn is fixed by pin 550.

FIGURE 10 illustrates an embodiment of the viewing and injection fitting shown in FIGURES 1 and 4. In the apparatus shown in FIGURE 10, a sight glass 620 is identical to that glass 120 used in the FIGURE 3 apparatus. As can be seen from the drawing, sight glass 620 is inverted with the apex of the cone extending upwardly. In this embodiment, a check valve identical in structure to that shown in FIGURE 4 is utilized. In cap 600 the inner rim 616 of lid 610 is threaded to receive the adjustable secondary seal 660. Adjustability is provided by threads 664 engaging the complementary threads of rim 616. The compression of the spring may be changed by turning the secondary seal, which engages the upper coil of the spring.

FIGURES 12 and 13 respectively illustrate the closed and open position for a sight glass injection fitting configured for flush installation in a tank. These devices differ from glass 120 shown in FIGURE 3 only in that rims 126 and 128 have been eliminated.

Figure 14:
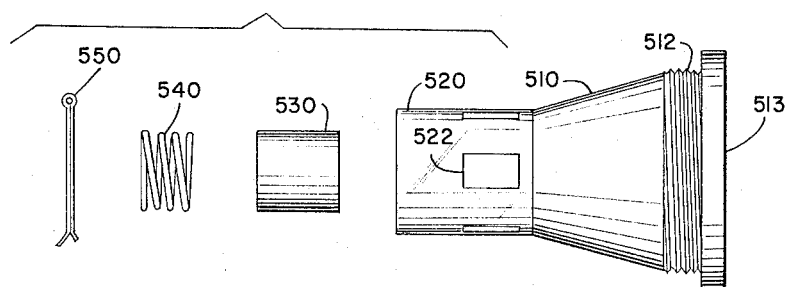
FIGURE 14 is the exploded view of the injection fitting shown in FIGURE 9.
Figure 15:
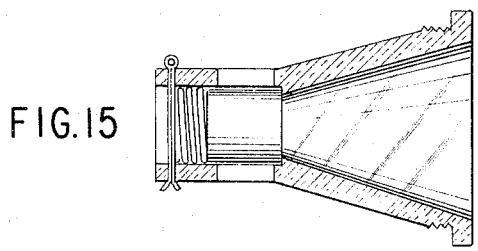
FIGURE 15 is an assembled view of the same injection fitting of FIGURES 9 and 14, shown in the closed position.
Figure 16:
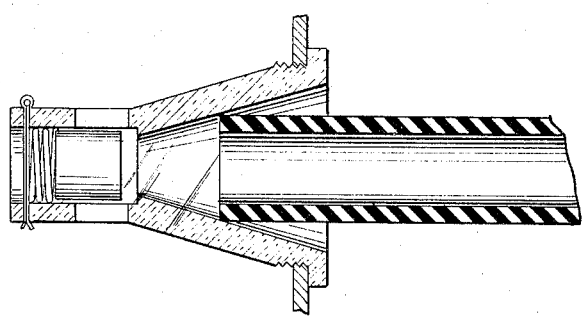
FIGURE 16 is an assembled view of the same injection fitting shown in the open position.

FIGURE 14 is an exploded view of the components of the viewing and injection fitting 500, shown in FIGURE 9. As may be seen from FIGURES 14 and the cross-sectional assembled view which is FIGURE 15, a slidable piston is urged into sealing abutment with a ledge at the base of cone 510. Spring 540, which urges the piston 530 into its sealed positioned is retained by pin 550. When water pressure is applied by a hose inserted in cone 510, piston 530 slides rearwardly to expose ports 522. Fluid thus may be added to the tank. Threads 512 and flange 513 are provided to facilitate the installation of the assembly in a tank.

Figure 17:
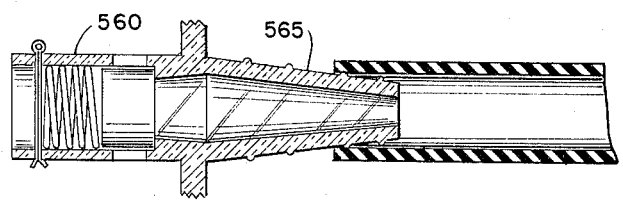
FIGURE 17 is an external modification of the injection fitting shown in FIGURES 9, 14, 15 and 16.

FIGURE 17 represents a second external embodiment of the fitting shown in FIGURES 9, 14, 15 and 16, in which cone 565 extends outwardly to receive a female connected hose.

Although this invention has been disclosed by way of specific embodiment, the entire scope of the invention is defined only in the claims hereto appended.

I claim:
1. A fluid tank fitting comprising:
 (A) a fluid level viewer defining a transparent cone, said cone defining first and second openings at opposite ends thereof;
 (B) a flange connected outwardly from said cone in sealing relationship thereto;
 (C) a fluid check valve comprising a seal, and means to position said seal into closing relationship with said first opening under predetermined pressure conditions, thereby permitting fluid under pressure to pass in one direction;
 (D) said check valve also including a vacuum-break, preventing reduction of pressure within the tank.
2. The fluid tank fitting as described in claim 1 wherein said means to position said seal into closing relationship with said first opening comprises:
 (E) a stem extending through said first opening;
 (F) a spring fixed to one end of said stem, said spring bearing against said viewer and urging said stem through said opening, said seal being mounted on the end of said stem opposite the spring.
3. The fluid tank fitting as described in claim 2, wherein said spring, stem, and seal, are interconnected so that said spring draws said stem through said opening.
4. The fluid tank fitting as described in claim 1, wherein said first opening is in the wall of said cone, and wherein said seal and said means to position said seal into closing relationship with said first opening comprises a resilient band stretched around said cone adjacent to said first opening;
 (E) and means attached to said cone spaced from said openings to hold said band in fixed longitudinal relationship with respect to said cone.
5. The fluid tank fitting as described in claim 1, wherein said cone additionally comprises at least one outwardly extending rim spaced from said sealing flange.
6. The fluid tank fitting described in claim 1 wherein said check valve comprises a cylindrical guide integrally formed in extension of said cone, adjacent said first opening thereof, said guide being open at both longitudinal ends and defining elongated openings intermediate the guide ends;
 (E) a shoulder on said cone adjacent said first cone opening and said guide;
 (F) a piston translatable within said guide;
 (G) a spring fixed to said guide, said spring positioning said piston into sealing relationship with said shoulder and said elongated openings; whereby pressure within said cone moves said piston against said spring force and said guide communicates said first cone opening with said elongated guide openings.

7. Apparatus for viewing fluid level within a tank and for injecting fluid into the tank comprising:
(A) transparent receiving cone;
(B) an outwardly extending flange integrally formed adjacent to the widest diameter portion of said cone;
(C) a check valve operable to seal in aperture defined by said cone, adjacent the smallest diameter portion of said cone;
(D) a host nozzle connected in sealing relationship to said cone, said nozzle comprising a cylindrical wall;
(E) at least one external cup extending from said wall, said at least one cup having a diameter at its open end such that it corresponds to the diameter of said cone at some point along the cone length.

8. A nozzle for injecting fluid into a tank comprising:
(A) a cylindrical wall having an input end for introducing fluid therethrough, and an output end feeding fluid into the tank;
(B) a plurality of similar cups externally attached to said wall adjacent said output end in sealing relationship with the tank, said cups describing sucessively decreasing maximum diameters.

References Cited by the Examiner
UNITED STATES PATENTS 2,058,118  10/1936  White _____ 141—392

LAVERNE D. GEIGER, *Primary Examiner.*

H. BELL, *Examiner.*